US012560688B2

(12) United States Patent
Jiang

(10) Patent No.: US 12,560,688 B2
(45) Date of Patent: Feb. 24, 2026

(54) LiDAR AND MOVABLE DEVICE

(71) Applicant: Suteng Innovation Technology Co., Ltd., Shenzhen (CN)

(72) Inventor: Peng Jiang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 24 days.

(21) Appl. No.: 18/638,235

(22) Filed: Apr. 17, 2024

(65) Prior Publication Data

US 2025/0298132 A1 Sep. 25, 2025

(30) Foreign Application Priority Data

Jun. 27, 2023 (CN) .......................... 202310760089.0

(51) Int. Cl.
| | |
|---|---|
| *G01C 3/08* | (2006.01) |
| *G01S 7/481* | (2006.01) |
| *G01S 7/4911* | (2020.01) |
| *G01S 7/4912* | (2020.01) |
| *G01S 7/4914* | (2020.01) |
| *G01S 17/34* | (2020.01) |

(52) U.S. Cl.
CPC .......... *G01S 7/4914* (2013.01); *G01S 7/4816* (2013.01); *G01S 7/4911* (2013.01); *G01S 7/4917* (2013.01); *G01S 17/34* (2020.01)

(58) Field of Classification Search
CPC .... G01S 7/4914; G01S 7/4816; G01S 7/4911; G01S 7/4917; G01S 17/34
See application file for complete search history.

(56) References Cited

U.S. PATENT DOCUMENTS

| | | | |
|---|---|---|---|
| 11,105,904 B1 * | 8/2021 | Hamidi ................. | G01S 7/4913 |
| 2015/0124242 A1 * | 5/2015 | Pierce ..................... | G01S 7/497 |
| | | | 356/5.01 |
| 2023/0228878 A1 * | 7/2023 | Asghari ................ | G01S 7/4917 |
| | | | 356/5.09 |

* cited by examiner

*Primary Examiner* — Mark Hellner
(74) *Attorney, Agent, or Firm* — Ladas & Parry LLP

(57) ABSTRACT

Embodiments of this application relates to the technical fields of optical signal processing and optical devices, providing a LiDAR and a movable device. The LiDAR comprises a receiving waveguide array, at least three photoelectric detection modules, at least three signal processing modules, and at least two analog-to-digital conversion modules. Since at least one of the analog-to-digital conversion modules is connected to the signal processing modules corresponding to at least two receiving waveguides that are not adjacent in the receiving waveguide array, there is no need to set up a digital-to-analog converter for each receiving waveguide, avoiding technical issues such as excessive number of converters and large data volume, while reducing the problem of crosstalk noise from bypass waveguides, thereby improving the performance of the LiDAR.

11 Claims, 5 Drawing Sheets

LiDAR AND MOVABLE DEVICE

CROSS-REFERENCE TO RELATED APPLICATION

The present application claims the benefit of priority to Chinese Patent Application No. 202310760089.0, filed on Jun. 27, 2023, which is hereby incorporated by reference in its entirety.

TECHNICAL FIELD

This application relates to the technical fields of optical signal processing and optical devices, particularly to Light Detection and Ranging (LiDAR) and a movable device.

BACKGROUND

Frequency Modulated Continuous Wave (FMCW) LiDAR can achieve ranging and speed measurement, and can serve as a perception sensor module for autonomous driving or driver assistance. Generally, an FMCW LiDAR includes a light source module, a scanning module, and a light receiving module. A light signal travels from the scanning module, reflects off a target object, and returns to the scanning module, the scanning module has changed its angle compared to the initial position. Therefore, the position where the reflected light falls on the light receiving module will vary at different distances. There is a solution that uses an waveguide array composed of multiple waveguides integrated on a silicon optical chip to receive the reflected light. Compared to solutions where a single waveguide receives the reflected light, the use of multiple waveguides can increase the overall light-receiving area when capturing the reflected light, thereby enhancing the ranging performance of the FMCW LiDAR.

However, currently, the downstream of each receiving waveguide needs to be individually connected to a photoelectric detection module, a signal processing circuit module, and an Analog-Digital Converter (ADC), resulting in a large number of ADC channels and high hardware costs.

SUMMARY

Embodiments of this application provides a LiDAR and a movable device, where at least two non-adjacent waveguides share the same analog-to-digital converter for signal acquisition, which can reduce the hardware cost of the LiDAR.

In a first aspect of embodiment of this application, a LiDAR is provided, comprising:

a receiving waveguide array, including at least three receiving waveguides, where the receiving waveguides have a light receiving surface for receiving echo light;

at least three photoelectric detection modules connected downstream of the receiving waveguides, configured to receive a local-oscillator light and the echo light output via the receiving waveguides, to generate a corresponding beat frequency signal, and one receiving waveguide corresponding to one photoelectric detection module;

at least three signal processing modules connected downstream of the photoelectric detection modules, including bandpass filter to filter the beat frequency signal, and one photoelectric detection module corresponding to one signal processing module; and at least two analog-to-digital conversion modules connected downstream of the photoelectric detection modules, including an analog-to-digital converter to perform analog-to-digital conversion on the beat frequency signal, where at least one analog-to-digital conversion module is connected to signal processing modules corresponding to at least two receiving waveguides that are not adjacent in the receiving waveguide array.

In a second aspect of embodiment of this application, a movable device is provided, including a movable base and the aforementioned LiDAR mounted on the base.

The LiDAR and movable device provided in embodiments of this application include a receiving waveguide array, at least three photoelectric detection modules, at least three signal processing modules, and at least two analog-to-digital conversion modules. By connecting at least one analog-to-digital conversion module to signal processing modules corresponding to at least two non-adjacent receiving waveguides in the receiving waveguide array, there is no need to set a separate analog-to-digital converter for each receiving waveguide, avoiding technical issues such as excessive number of converters, large data volume, and reduction of crosstalk noise from bypass waveguides, thereby improving the performance of the LiDAR.

BRIEF DESCRIPTION OF DRAWINGS

By combining the drawings, a more detailed description of exemplary embodiments of the present application is provided, whereby the above and other objectives, features, and advantages of the present application will become more apparent. In the exemplary embodiments of the present application, the same reference numerals generally represent the same components.

DETAILED DESCRIPTION

Figure 1:
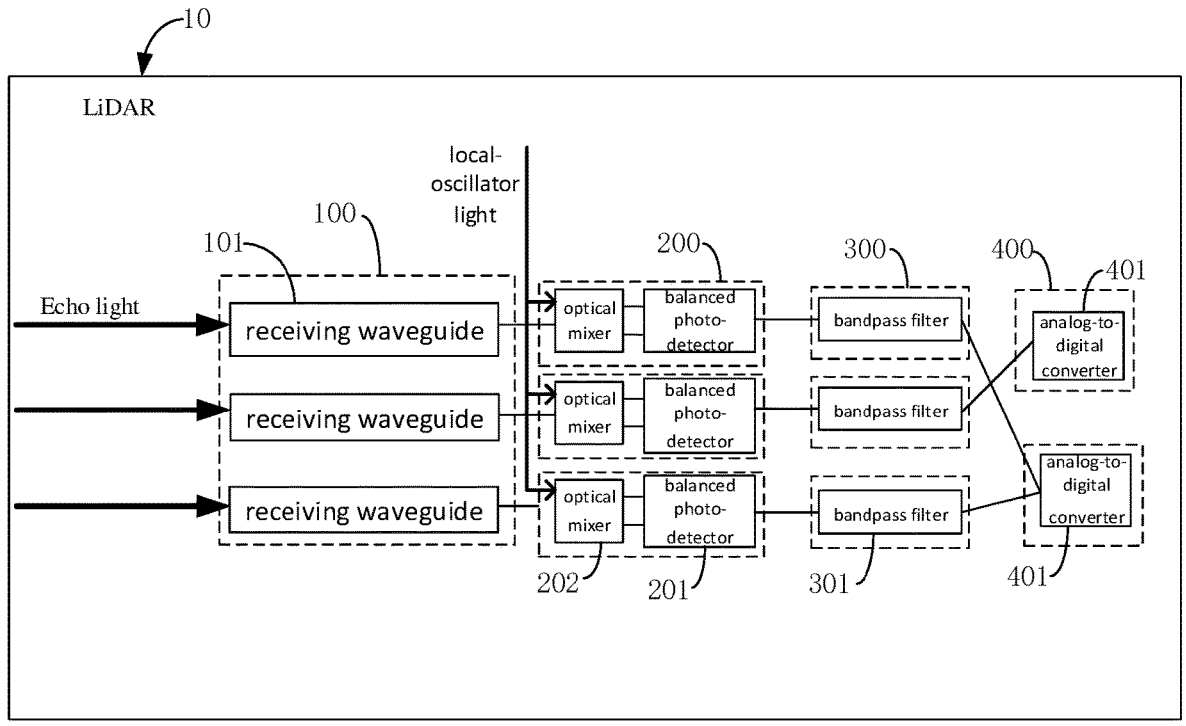
FIG. 1 is a schematic diagram of a LiDAR in an embodiment.

The following will describe in more detail the embodiments of the present application with reference to the drawings. The same reference numerals in the drawings indicate the same or similar parts, so repetitive descriptions of them will be omitted. Some of the block diagrams shown in the drawings are functional entities and do not necessarily correspond to physically or logically independent entities. These functional entities can be implemented in software form, or in one or more hardware modules or integrated circuits, or in different networks and/or processing devices and/or microcontroller devices.

The terms used in this application are solely for describing specific embodiments. The singular forms "a," "an," and "the" used are intended to include the plural forms unless the context clearly indicates otherwise. It should also be understood that the term "and/or" used herein refers to any or all possible combinations of one or more of the associated listed items.

Although terms such as "first," "second," "third," etc., may be used to describe various information in embodiments of this application. These terms are used only to distinguish the same type of information from each other. For example, the first information can also be referred to as the second information, and similarly, the second information can also be referred to as the first information. Therefore, features designated as "first" and "second" may explicitly or implicitly include one or more of those features. In the description, the meaning of "multiple" is two or more, unless otherwise specifically defined.

The following detailed description is provided in conjunction with the accompanying drawings to elaborate on the LiDAR and the movable device disclosed in embodiments of this application.

FIG. 1 is a schematic diagram of a LiDAR in some embodiments.

The LiDAR in embodiments of this application can be a Frequency Modulated Continuous Wave (FMCW) LiDAR. An FMCW LiDAR emits continuous detection light towards a target object, then receives a local-oscillator light with the same time-frequency characteristics as the detection light signal, and an echo light formed by the detection light reflected by the target object, in order to detect the target object. The local-oscillator light and the detection light can be obtained by splitting the light beam generated by a light source in the LiDAR through a beam splitter, or they can be obtained by two different light sources separately; in embodiments of this application, "same time-frequency characteristics" means that the local-oscillator light and the detection light have consistent frequencies at the same time point in the time domain.

Referring to FIG. 1, the LiDAR 10 disclosed in an embodiment includes a receiving waveguide array 100, at least three photoelectric detection modules 200, at least three signal processing modules 300, and at least two analog-to-digital conversion modules 400.

In an embodiment, the receiving waveguide array 100 includes at least three receiving waveguides 101. The receiving waveguide 101 has a light receiving surface, which is used to receive echo light. In an embodiment, the light receiving surface of the receiving waveguide 101 refers to an end face of the receiving waveguide 101, which is used to receive echo light. During the operation of the LiDAR 10, the emitted detection light is reflected by the target object to form echo light, and the echo light enters the interior of the receiving waveguide 101 through the light receiving surface of the receiving waveguide 101.

In an embodiment, the receiving waveguide array 100 is integrally integrated on a silicon photonic chip. In an embodiment, the silicon photonic chip includes a cladding layer, and the receiving waveguide array 100 is embedded in the cladding layer. The material, shape, and size of the receiving waveguides can be selected and optimized, signal characteristics, to adapt to different scenarios and improve the stability and accuracy of the LiDAR.

In an embodiment, the LiDAR 10 includes a scanning module, the scanning module is located downstream of the light source module in the LiDAR 10 along the transmission direction of the detection light, and upstream of the receiving waveguide array 100 along the transmission direction of the echo light. During the operation of the LiDAR 10, the scanning module generates motion (such as rotation, etc.), so that the transmission paths of the detection light before the scanning module and the echo light after the scanning module are no longer consistent, and the positions on the receiving waveguide array where the echo light corresponding to different distances falls are also no longer the same. Embodiments of this application refers to the effect of the echo light falling on different positions of the receiving waveguide array due to different detection distances as the "walk-off effect." The arrangement of the receiving waveguide array 100 is intended to provide a larger light-receiving area to reduce the above-mentioned walk-off effect. The detection distance ranges corresponding to different receiving waveguides 101 are also different. For example, in some embodiments, the receiving waveguide at the bottom of FIG. 1 is the receiving waveguide for short-distance detection, and from bottom to top, the detection distances of each receiving waveguide gradually increase; in other words, the walk-off effect mentioned above causes the echo light corresponding to larger detection distances to fall closer to the top of the receiving waveguide array (as shown in FIG. 1). In an embodiment, the quantity of receiving waveguides in the receiving waveguide array 100 can be one or more. The term "multiple" as described in embodiments refers to two or more.

For the above-mentioned photoelectric detection module 200, please refer to FIG. 1. The LiDAR 10 comprises at least three photoelectric detection modules 200, which are connected downstream of the receiving waveguide 101. The photoelectric detection modules are used to receive a local-oscillator light, and to receive an echo light output via the receiving waveguide, to generate a corresponding beat frequency signal. Each photoelectric detection module 200 corresponds to each receiving waveguide 101, for receiving the local-oscillator light and the echo light output by the corresponding receiving waveguide 101, thereby generating a beat frequency signal based on the local-oscillator light and the echo light. The frequency of the beat frequency signal is the frequency difference between the two optical signals, and the beat frequency signal is an electrical signal after photoelectric conversion by the photoelectric detection module 200. In this context, "downstream" as used in embodiments of this application refers to a position further back along the direction of transmission of light signal or electrical signal; for example, "the photoelectric detection module is connected downstream of the receiving waveguide" means that a light signal passes through the receiving waveguide before reaching the photoelectric detection module.

In an embodiment, the photoelectric detection module 200 may include an optical mixer 202 and a balanced photodetector 201. The optical mixer 202 has two input ports, one input port is used to receive the local-oscillator light, and the other input port is used to receive the echo light output by the receiving waveguide 101; the local-oscillator light and the echo light can beat inside the optical mixer 202, to obtain two beat frequency optical signals, namely a first beat frequency optical signal and a second beat frequency optical signal. In an embodiment, the optical mixer 202 is a 180-degree mixer, with a phase difference of 180 degrees between the two output optical signals. The balanced photodetector 201 is connected to the two outputs of the optical mixer 202, and is used to perform balanced detection on the first beat frequency optical signal and the second beat frequency optical signal, and output the beat frequency signal; the frequency of this beat frequency signal is consistent with the frequency of the first/second beat frequency optical signals. In an embodiment, the photoelectric detection module 200 can receive the local-oscillator light and the detection light, and convert the beat frequency optical signal generated by the mixing of the two into an electrical signal. In some embodiments, the photoelectric detection module 200 includes a photoelectric detector, the photoelectric detector is used to receive the local-oscillator light and the echo light, causing them to beat, and is also used to convert the obtained beat frequency optical signal into an electrical signal, namely the beat frequency signal.

For the signal processing module 300 mentioned above, please refer to FIG. 1. The LiDAR 10 includes at least three signal processing modules 300. The signal processing module 300 is connected downstream of the photoelectric detection module 200 and corresponds one-to-one with the photoelectric detection module 200. The signal processing module 300 is used to process the beat frequency signal output by the photoelectric detection module 300 in the time domain. In an embodiment, the signal processing module includes a bandpass filter 301, which is used to filter the beat frequency signal. The bandpass filter 301 can be a first-order, second-order, or multi-order filter, and can be of low-ripple types such as Butterworth or Bessel filters.

In an embodiment, the beat frequency of the local oscillator light is coupling of the distance beat frequency and the velocity beat frequency. The distance beat frequency is the beat frequency caused by the displacement of the detection light relative to the local oscillator light during the flight time, resulting in a beat frequency between the detection light (echo light) and the local oscillator light; magnitude of the distance beat frequency is equal to the product of the sweep rate of the detection light and the flight time of the detection light, and it is only related to the flight time, not to the velocity of the target object. The velocity beat frequency is the Doppler frequency shift effect caused by the velocity of the target object, resulting in a beat frequency between the detection light and the local oscillator light; magnitude of the velocity beat frequency is equal to twice the radial velocity of the target object relative to the LiDAR divided by the wavelength of the detection light. The distance beat frequency is $f_r=k\times\tau$, velocity beat frequency is $$f_v = \frac{2\times v}{\lambda} = \frac{2\times v\times f_0}{c},$$

and the beat frequency between the local oscillator light and the echo light is $f_p=|f_r\pm f_v|$; where k is the frequency modulation slope of the detection light, τ is the flight time of the detection light, v is the radial velocity of the target object relative to the LiDAR, λ is the wavelength of the detection light (central wavelength), c is the speed of light, $f_0$ is the central frequency of the detection light.

Based on the walk-off effect, detection range of each receiving waveguide 101 is a distance range interval. The frequency value of the beat signal is equal to the sum or difference of the distance beat frequency and the velocity beat frequency. In an embodiment, the lower limit of the frequency range of the beat signal corresponding to the echo light output by the receiving waveguide is roughly the distance beat frequency lower limit minus the maximum velocity beat frequency, and the upper limit is roughly the distance beat frequency upper limit plus the maximum velocity beat frequency. Therefore, noise outside this range can be filtered out by the bandpass filter 301. The passband of the bandpass filter 301 can be determined based on the detection distance of each receiving waveguide during design and the maximum detection speed of the LiDAR. In an embodiment, the range of the distance beat frequency can be determined based on the detection distance of each receiving waveguide, and the maximum velocity beat frequency can be determined based on the maximum detection speed of the LiDAR. Then, frequency range of the beat signal output by the photoelectric detection module 300 corresponding to each receiving waveguide 101 can be determined based on these values, and the passband of the bandpass filter 301 can be set accordingly. In an embodiment, the "passband of the bandpass filter" as described in this application refers to the passband corresponding to the −3 dB bandwidth of the filter.

For the analog-to-digital conversion module 400 mentioned above, please refer to FIG. 1. The LiDAR 100 includes at least two analog-to-digital conversion modules 400, which are connected downstream of the photoelectric detection module 200, they are used to perform analog-to-digital conversion on the beat frequency signals filtered by the signal processing module 300, so that the converted signals can be subjected to Fourier transformation downstream. In an embodiment, at least one analog-to-digital conversion module 400 satisfies the condition that the analog-to-digital conversion module 400 is connected to the signal processing modules 300 corresponding to at least two receiving waveguides 101 in the receiving waveguide array 100 that are not adjacent. In an embodiment, the analog-to-digital conversion module 400 includes an analog-to-digital converter 401, which is used to receive the aforementioned beat frequency signals and perform analog-to-digital conversion on them. In the embodiments of the present application, by connecting multiple signal processing modules 300 to one analog-to-digital conversion module 400, the number of analog-to-digital conversion modules 400 can be reduced, thereby reducing the number of components and lowering hardware costs.

Figure 2:
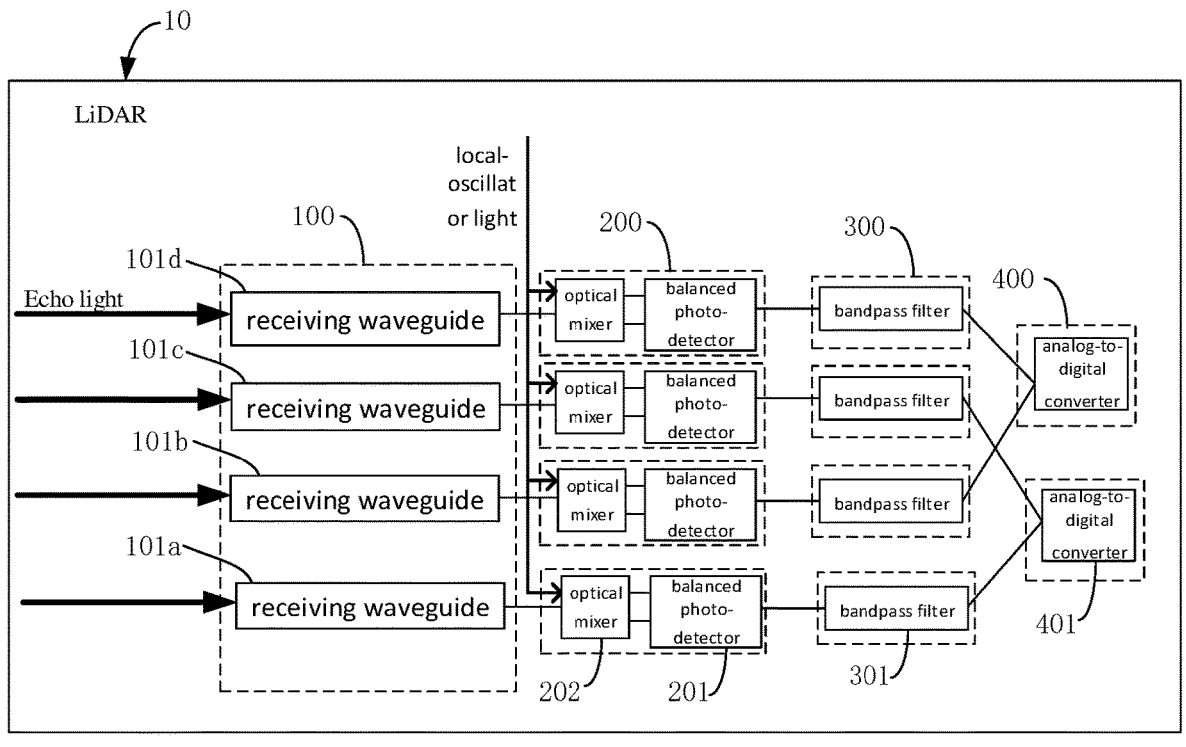
FIG. 2 is a schematic diagram of a LiDAR in an embodiment.

Refer to FIG. 2, which is a schematic diagram of a LiDAR in another embodiment, the receiving waveguide array 100 includes four receiving waveguides arranged in sequence, namely a first receiving waveguide 101a, a second receiving waveguide 101b, a third receiving waveguide 101c, and a fourth receiving waveguide 101d as shown in the figure; correspondingly, the LiDAR 10 includes four photoelectric detection modules 200, four signal processing modules 300, and two analog-to-digital conversion modules 400. Each analog-to-digital conversion module 400 is connected to two receiving waveguides 101, and the two receiving waveguides 101 connected to each analog-to-digital conversion module 400 are not adjacent; for example, the analog-to-digital conversion modules 400 shown at the bottom of FIG. 2 are respectively connected to the first receiving waveguide 101a and the third receiving waveguide 101c, while the analog-to-digital conversion modules 400 shown at the top of FIG. 2 are respectively connected to the second receiving waveguide 101b and the fourth receiving waveguide 101d.

In some embodiments, two adjacent receiving waveguides are connected corresponding to a signal processing module 300 through an analog-to-digital conversion module 400. However, in this embodiment, the passbands of the bandpass filters 301 corresponding to the two adjacent receiving waveguides overlap to form a first overlapped frequency band, causing the noise outputs of the two signal processing modules 300 to superimpose in this first overlapped frequency band. Due to the relatively wide frequency bandwidth of this first overlapped frequency band in this approach, i.e., the wide band where noise is superimposed, the signal-to-noise ratio is relatively low when the beat frequency signal frequency is within this first overlapped frequency band. Furthermore, when the light signals fall on two adjacent receiving waveguides 101 and the gap between them, there is a phase difference between the light signals output by the two receiving waveguides 101, making it more complex for the same analog-to-digital conversion module 400 to process the signals output by the two receiving waveguides 101. In contrast, in some embodiments, the receiving waveguides 101 connected to the same analog-to-digital conversion module 400 are two waveguides separated by an interval in the receiving waveguide array 100, and the passbands of the corresponding bandpass filters will not have overlapping regions. Alternatively, the passbands of the corresponding bandpass filters may still have the aforementioned first overlapped frequency band, but the bandwidth of this first overlapped frequency band is narrower, resulting in a lower frequency for the beat frequency signal within this frequency band, thereby mitigating to some extent the low signal-to-noise ratio issue caused by the above approach. In an embodiment, when the light signals fall on two adjacent receiving waveguides 101 and the gap between them, different analog-to-digital conversion modules 400 will process the signals output by these two receiving waveguides 101, thus overcoming the aforementioned shortcomings.

In an embodiment, in the signal processing modules 300 connected to the same analog-to-digital conversion module 400, the passbands of each bandpass filter 301 do not overlap. Taking the analog-to-digital conversion module 400 below FIG. 2 as an example, the detection distance of the first receiving waveguide 101a is from the first distance to the second distance, and corresponding distance beat frequency range is from the first frequency to the second frequency; the detection distance of the third receiving waveguide 101c is from the third distance to the fourth distance, and corresponding distance beat frequency range is from the third frequency to the fourth frequency. The second receiving waveguide 101b is located between the first receiving waveguide 101a and the third receiving waveguide 101c, with a detection distance from the second distance to the third distance, corresponding to the second frequency to the third frequency. In an embodiment, the first frequency, the second frequency, the third frequency, and the fourth frequency increase sequentially. The term "two adjacent receiving waveguides in the receiving waveguides connected to the same analog-to-digital conversion module" means that when the analog-to-digital conversion module 400 is connected to two receiving waveguides 101, these two receiving waveguides 101 are the aforementioned adjacent two receiving waveguides. When the analog-to-digital conversion module 400 is connected to three or more receiving waveguides 101, the adjacent two receiving waveguides 101 among these three or more receiving waveguides 101 are the aforementioned adjacent two receiving waveguides in the receiving waveguides connected to the same analog-to-digital conversion module, and there are no other receiving waveguides 101 connected to the same analog-to-digital conversion module 400 between these adjacent two receiving waveguides.

Figure 3A:
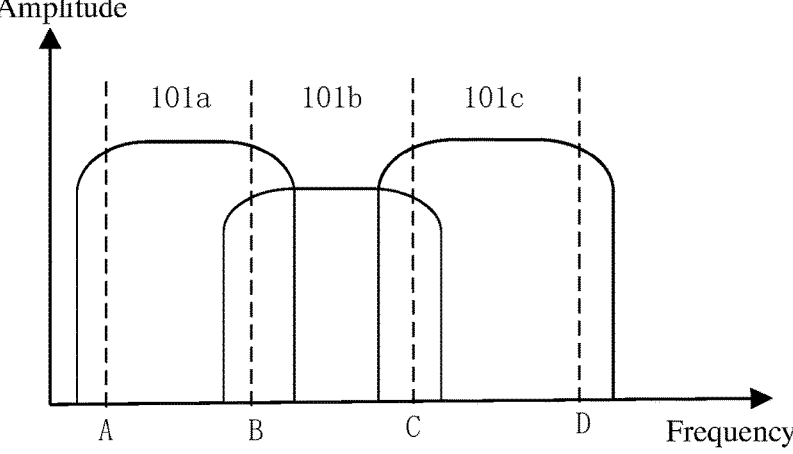
FIG. 3A is a schematic diagram of the passband configuration of a bandpass filter in an embodiment.

Refer to FIG. 3A, which shows a schematic diagram of the passband configuration of the bandpass filters 301 corresponding to the first receiving waveguide 101a, the second receiving waveguide 101b, and the third receiving waveguide 101c, FIG. 3A is shown with the abscissa as frequency and the ordinate as amplitude. Combining with FIG. 2, the passband of the bandpass filter 301 corresponding to the first receiving waveguide 101a (shown as the rounded rectangle on the far left in the figure) will be widened outward based on the above-mentioned first frequency A and second frequency B, and the passband of the bandpass filter 301 corresponding to the third receiving waveguide 101c (shown as the rounded rectangle on the far right in the figure) will be widened outward based on the above-mentioned third frequency C and fourth frequency D. In an embodiment, the passbands of the two bandpass filters 301 corresponding to the first receiving waveguide 101a and the third receiving waveguide 101c do not overlap, thus avoiding the formation of noise superimposed frequency band regions. Therefore, when the echo light falls on either of the two receiving waveguides 101, the signal chain downstream of the other receiving waveguide will not cause noise superposition during the beat frequency signal analog-to-digital conversion.

In some embodiments, in each of the receiving waveguides 101 connected to the same analog-to-digital conversion module 400, the passbands of the bandpass filters 301 corresponding to the two adjacent receiving waveguides 101 can also have a first overlapped frequency band.

Figure 3B:
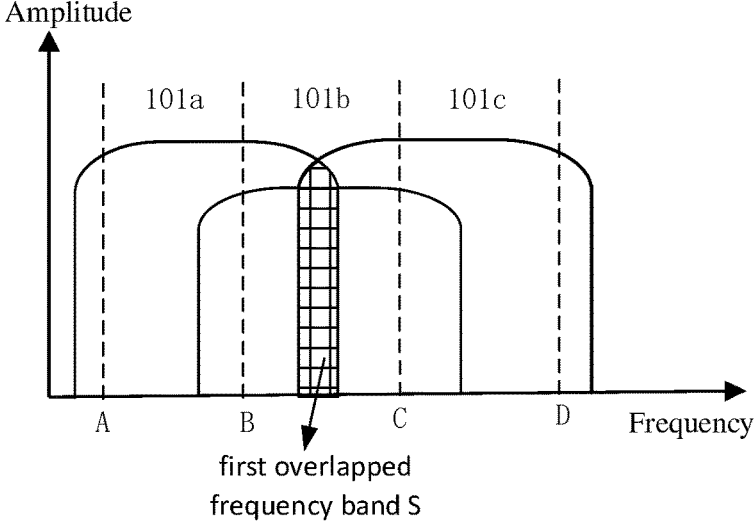
FIG. 3B is a schematic diagram of the passband configuration of a bandpass filter in an embodiment.

In an embodiment, refer to FIG. 3B, which illustrates a schematic diagram of the passband configuration of the bandpass filters 301 corresponding to the first receiving waveguide 101a, the second receiving waveguide 101b, and the third receiving waveguide 101c in an embodiment, FIG. 3B is shown with the abscissa as frequency and the ordinate as amplitude. The passbands of the two bandpass filters 301 corresponding to the first receiving waveguide 101a and the third receiving waveguide 101c form the first overlapped frequency band S, as shown in the shaded area in FIG. 3B, which is located between the second frequency B and the third frequency C. In an embodiment, there is no noise overlap between the first frequency A and the second frequency B, and between the third frequency C and the fourth frequency D. Since the first receiving waveguide 101a and the third receiving waveguide 101c are connected to the same analog-to-digital conversion module 400, the frequencies of the beat frequency signals received by the first receiving waveguide 101a and the third receiving waveguide 101c mostly fall between the first frequency A and the second frequency B, or between the third frequency C and the fourth frequency D, which is particularly suitable for relatively stationary or slow-moving target objects. Therefore, the setting of the first overlapped frequency band S between the second frequency B and the third frequency C ensures a relatively high signal-to-noise ratio for signals within these two frequency ranges.

Although the above embodiments are described using an example of a receiving waveguide array including four receiving waveguides, the quantity of receiving waveguides may be other values, the quantity of receiving waveguides connected to each analog-to-digital conversion module may be three, four or other integer values. As long as at least one analog-to-digital conversion module is indirectly connected to multiple receiving waveguides (i.e., connected through photoelectric detection modules and signal processing modules); for example, in an embodiment, the receiving waveguide array can include at least four receiving waveguides, and each analog-to-digital conversion module is connected to at least two receiving waveguides, with no two receiving waveguides connected to the same analog-to-digital conversion module being adjacent to each other.

Figure 4:
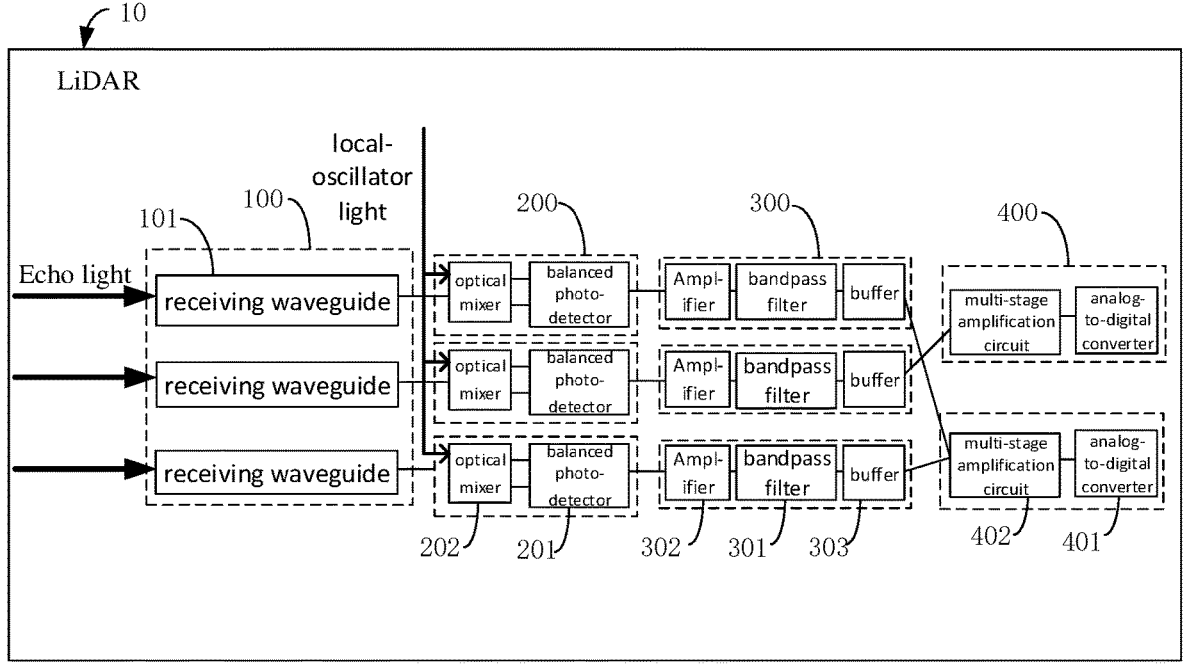
FIG. 4 is a schematic diagram of a LiDAR provided in an embodiment.

See FIG. 4, which is a schematic diagram of a LiDAR provided in an embodiment. The signal processing module 300 may include an amplifier 302, which is connected between the photoelectric detection module 200 and the bandpass filter 301. The amplifier 302 is used to amplify the above beat frequency signal for subsequent processing and analysis. The amplifier 302 can be a transimpedance amplifier, or other type of amplifier which can achieve signal amplification.

In an embodiment, a buffer 303 may be included in the signal processing module 300, which is connected downstream of the bandpass filter 301. The buffer 303 ensures the integrity and stability of signal transmission.

In an embodiment, the amplifier 302 and the buffer 303 can be configured so that each downstream of the receiving waveguide 101 is equipped with corresponding amplifier 302 and buffer 303, or the downstream of one or several receiving waveguides 101 is equipped with corresponding amplifier 302 and buffer 303.

In an embodiment, the analog-to-digital conversion module 400 may include a multi-stage amplification circuit 402 disposed between the signal processing module and the analog-to-digital converter 401. The multi-stage amplification circuit 402, corresponding to the analog-to-digital converter 401, can amplify the signal transmitted to the analog-to-digital converter 401, suppress noise, and increase gain.

Figure 5:
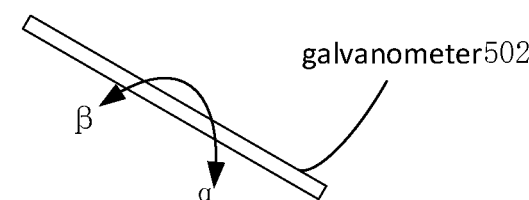
FIG. 5 is a schematic diagram of a LiDAR in an embodiment.
Figure 5:
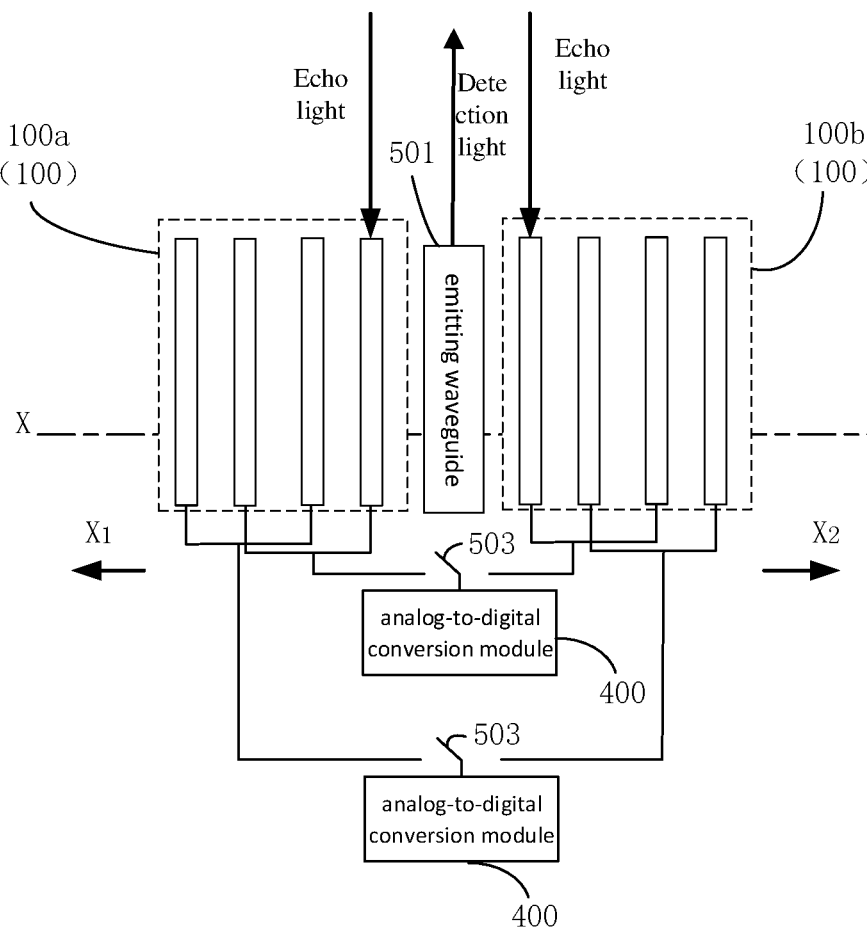

Referring to FIG. 5, FIG. 5 is a schematic diagram of a LiDAR in an embodiment.

As shown in FIG. 5, the LiDAR comprises an emitting waveguide 501, a galvanometer 502, and two receiving waveguide arrays 100.

The emitting waveguide 501 has a light emitting surface, the emitting waveguide 501 is used to transmit detection light, and the detection light is emitted via the light emitting surface. Where, the detection light is generated by the light source module inside the LiDAR, one end of the emitting waveguide 501 far away from the light emitting surface is used to receive the detection light so that the detection light propagates inside it and is emitted via the aforementioned light emitting surface. The optical signal of the detection light can be a frequency-modulated continuous wave signal, a laser signal with frequency modulation, a triangular wave, a sawtooth wave, or other waveforms.

The receiving waveguides 101 in the receiving waveguide array 100 are arranged along the illustrated preset direction X, where the preset direction X is parallel to the light receiving surface and can be perpendicular to the direction in which the emitting waveguide 501 emits the detection light. There are two receiving waveguide arrays 100, receiving waveguide array 100a and receiving waveguide array 100b, positioned on both sides of the emitting waveguide 501 along the preset direction X. The first receiving waveguide array 100a and the second receiving waveguide array 100b can be symmetrically or asymmetrically arranged, for example, with an equal or different quantity of receiving waveguides in the first receiving waveguide array 100a and the second receiving waveguide array 100b. The emitting waveguide 501 and the various receiving waveguide arrays 100 can be integrated on the same silicon optical chip. In an embodiment, the silicon optical chip includes a cladding layer, within which the emitting waveguide 501 and the various receiving waveguide arrays 100 are embedded.

Each receiving waveguide array 100 can include N receiving waveguides, where N≥1; the nth receiving waveguide along the first direction in the first receiving waveguide array 100a is connected to the same analog-to-digital conversion module as the nth receiving waveguide along the second direction in the second receiving waveguide array 100b, where 1≤n≤N. Refer to FIG. 5, the first direction X1 is the direction in which the second receiving waveguide array 100b points to the first receiving waveguide array 100a, and the second direction X2 is the direction in which the first receiving waveguide array 100a points to the second receiving waveguide array 100b.

In an embodiment, the connection relationship between the first receiving waveguide array 100a and downstream functional modules can refer to the previous embodiments, the connection relationship between the second receiving waveguide array 100b and downstream functional modules can refer to the previous embodiments. When the LiDAR 10 is equipped with two receiving waveguide arrays 100, the two receiving waveguide arrays 100 can share the analog-to-digital conversion module. The two receiving waveguide arrays are respectively associated with two analog-to-digital conversion modules as described in the previous embodiments. For example, in FIG. 5, the first receiving waveguide in the first direction X1 of the first receiving waveguide array 100a can be connected to the same analog-to-digital conversion module as the first receiving waveguide in the second direction X2 of the second receiving waveguide array 100b, and the second receiving waveguide in the first direction X1 of the first receiving waveguide array 100a can be connected to the same analog-to-digital conversion module as the second receiving waveguide in the second direction X2 of the second receiving waveguide array 100b.

The galvanometer 502 is a rotatable reflective structure, used to receive the detection light emitted through the emitting waveguide and deflect the detection light, so that the detection light is emitted outside the LiDAR 10 to detect a target object. The galvanometer 502 is also used to receive the echo light formed by the detection light reflected by the target object and deflect it so that the echo light falls on the receiving waveguide array 100 for echo light reception. The galvanometer 502 has a first axis and a second axis, where the galvanometer can rotate around the first axis so that the detection light can scan in a direction perpendicular to the first axis, and can rotate around the second axis so that the detection light can scan in a direction perpendicular to the second axis. The rotation speed of the galvanometer around the first axis is faster than the rotation speed around the second axis. For example, the first axis is a vertical line, and the galvanometer can rotate around the vertical line so that the detection light can scan horizontally. The second axis is a horizontal line, and the galvanometer can rotate around the horizontal line so that the detection light can scan vertically.

Due to the higher scanning speed of the galvanometer around the first axis, the resulting walk-off effect is more pronounced, so the orientation of the receiving waveguide array 100 should be configured to align the predetermined direction X with the walk-off effect direction caused by the rotation of the galvanometer 502 around the first axis. In an embodiment, based on the configuration of the LiDAR 10 comprising the first receiving waveguide array 100a and the second receiving waveguide array 100b, the receiving waveguide array 100 and the galvanometer 502 are arranged such that: when the galvanometer 502 rotates around the first axis in the first direction a, the light spot of the echo light shifts relative to the emitting waveguide 501 along the illustrated first direction X1 and falls on the first receiving waveguide array 100a; when the galvanometer 502 rotates around the first axis in the second direction B, the light spot of the echo light shifts relative to the emitting waveguide 501 along the illustrated second direction X2 and falls on the second receiving waveguide array 100b; wherein the first direction X1 and the second direction X2 are opposite.

In an embodiment, the LiDAR 10 can, based on the operation principle of the aforementioned receiving waveguide array 100, expand into more receiving waveguide arrays 100 and downstream modules, which are not elaborated here. In an embodiment, the receiving waveguide array 100 and the emitting waveguide 501 can be integrated as a transceiver module in the LiDAR 10.

In an embodiment, the LiDAR 10 may be configured with a switch circuit 503.

In an embodiment, the rotation of the galvanometer 502 causes the light spot of the echo light to fall on the first receiving waveguide array 100*a*. The switch circuit 503 can be configured to conduct the photoelectric detection module corresponding to the first receiving waveguide array 100*a* and the analog-to-digital conversion module. When the rotation of the galvanometer 502 causes the light spot of the echo light to fall on the second receiving waveguide array 100*b*, it can conduct the photoelectric detection module corresponding to the second receiving waveguide array 100*b* and the analog-to-digital conversion module. That is, based on the direction of rotation of the galvanometer 502, the conduction state of each receiving waveguide array and its corresponding analog-to-digital conversion module can be controlled. The switch circuit 503 can be an electronic selector switch.

When the light spot falls on the first receiving waveguide array 100*a*, the second receiving waveguide array 100*b* does not have echo light that can be received; similarly, when the light spot falls on the second receiving waveguide array 100*b*, the first receiving waveguide array 100*a* also does not have echo light that can be received.

In an embodiment, the switch circuit 503 can control the connection between the analog-to-digital conversion module 400 and either the first receiving waveguide array 100*a* or the second receiving waveguide array 100*b*, thereby avoiding noise introduced by the receiving waveguide array 100, photoelectric detection module 200, and signal processing module 300 that have not received light. This arrangement effectively doubles the signal-to-noise ratio, thereby enhancing the detection performance of the LiDAR.

Figure 6:
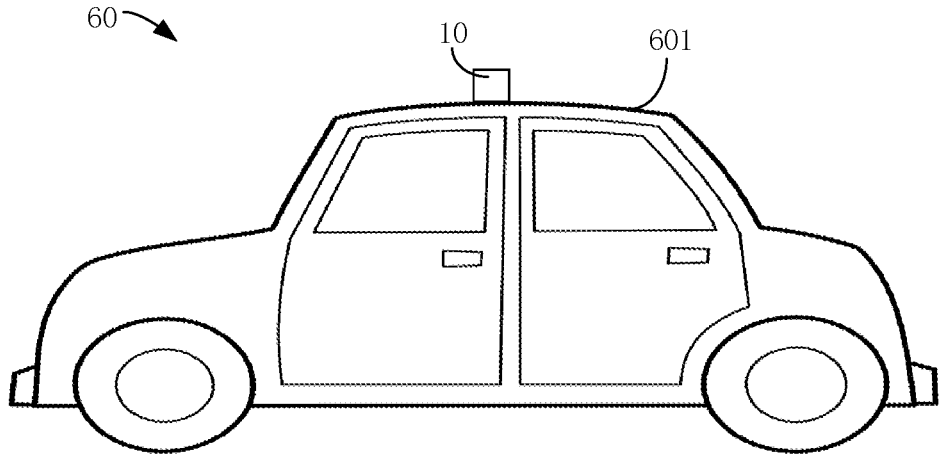
FIG. 6 is a schematic diagram of a movable device in an embodiment.

Embodiments of the present application provides a movable device 60. FIG. 6 is a schematic diagram of a movable device. The movable device 60 is a device that can move relative to the ground and includes a movable base 601 and a LiDAR 10 mounted on the base. The LiDAR 10 is the LiDAR 10 in any of the embodiments described above.

The movable device includes vehicles with six levels of automated driving technology as defined by the Society of Automotive Engineers International (SAE International) or the Chinese national standard "Classification for Automotive Driving Automation Levels" from L0 to L5. For example, it can be a vehicle or robot device with various functions such as:

(1) Passenger function, such as household cars, buses, etc.;

(2) Cargo functions, such as ordinary trucks, box trucks, trailer trucks, enclosed trucks, tank trucks, flatbed trucks, container trucks, dump trucks, special structure trucks, etc.;

(3) Functional applications, such as logistics delivery vehicles, Automated Guided Vehicles (AGVs), patrol cars, cranes, hoists, excavators, bulldozers, forklifts, road rollers, loaders, off-road engineering vehicles, armored engineering vehicles, sewage treatment vehicles, sanitation vehicles, vacuum trucks, street sweepers, floor scrubbers, water trucks, sweeping robots, food delivery robots, shopping guide robots, lawn mowers, golf carts, etc.;

(4) Entertainment functions, such as entertainment vehicles, automatic driving devices in amusement parks, and self-balancing vehicles;

(5) Special rescue functions, such as fire trucks, ambulances, power repair vehicles, engineering emergency vehicles, etc.

What is claimed is:

1. A Light Detection and Ranging apparatus (LiDAR), comprising:

a receiving waveguide array, including at least four receiving waveguides, wherein the receiving waveguides have a light receiving surface, and the light receiving surface is configured to receive an echo light;

at least three photoelectric detection modules, wherein the photoelectric detection modules are connected downstream of the receiving waveguides, the photoelectric detection modules are configured to receive a local-oscillator light and the echo light output via the receiving waveguides, to generate a corresponding beat frequency signal, and one receiving waveguide corresponds to one photoelectric detection module;

at least three signal processing modules, wherein the signal processing modules are connected downstream of the photoelectric detection modules, the signal processing modules comprise a bandpass filter, and the bandpass filter is configured to filter the beat frequency signal, and one photoelectric detection module corresponds to one signal processing module; and at least two analog-to-digital conversion modules, wherein one analog-to-digital conversion module is connected to at least two receiving waveguides, and the receiving waveguides connected to the same analog-to-digital conversion module are not adjacent, wherein the analog-to-digital conversion modules are connected downstream of the photoelectric detection modules, the analog-to-digital conversion modules comprise an analog-to-digital converter, and the analog-to-digital converter is configured to perform analog-to-digital conversion on the beat frequency signal, wherein at least one analog-to-digital conversion module satisfies:

the analog-to-digital conversion module is connected to the signal processing modules corresponding to at least two receiving waveguides that are not adjacent in the receiving waveguide array.

2. The LiDAR according to claim 1, wherein in signal processing modules connected to the same analog-to-digital conversion module, passbands of each bandpass filter do not overlap; and a passband of the bandpass filter is a passband corresponding to a −3 dB bandwidth of the bandpass filter.

3. The LiDAR according to claim 1, wherein in receiving waveguides connected to the same analog-to-digital conversion module, the two passbands of the bandpass filters corresponding to two adjacent receiving waveguides have a first overlapped frequency band, a frequency range of distance beat frequency corresponding to a detection distance of one of the two adjacent receiving optical waveguides is from a first frequency to a second frequency, a frequency range of distance beat frequency corresponding to a detection distance of the other of the two adjacent receiving optical waveguides is from a third frequency to a fourth frequency, the first frequency, the second frequency, the third frequency, and the fourth frequency are increased in sequence, and the first overlapped frequency band is between the second frequency and the third frequency; and a passband of the bandpass filter is a passband corresponding to a −3 dB bandwidth of the bandpass filter.

4. The LiDAR according to claim 1, wherein the signal processing module further comprises an amplifier, and the amplifier is connected between the photoelectric detection module and the bandpass filter.

5. The LiDAR according to claim 1, wherein the signal processing module further comprises a buffer, and the buffer is connected downstream of the bandpass filter.

6. The LiDAR according to claim 1, wherein the analog-to-digital conversion module further comprises a multi-stage amplification circuit; and the multi-stage amplification circuit is disposed between the signal processing module and the analog-to-digital converter.

7. The LiDAR according to claim 1, wherein the receiving waveguide array comprises a first receiving waveguide, a second receiving waveguide, a third receiving waveguide, and a fourth receiving waveguide that are arranged in sequence; and the first receiving waveguide and the third receiving waveguide are connected to the same analog-to-digital conversion module via a corresponding photoelectric detection module and a signal processing module, and the second receiving waveguide and the fourth receiving waveguide are connected to another analog-to-digital conversion module via a corresponding photoelectric detection module.

8. The LiDAR according to claim 1, wherein the photoelectric detection module comprises an optical mixer and a balanced photodetector;

the optical mixer is configured to receive a local-oscillator light and an echo light output via the receiving waveguide, and output a first beat frequency signal and a second beat frequency signal with a phase difference; and the balanced photodetector is connected to the optical mixer, and is configured to perform balanced detection on the first beat frequency signal and the second beat frequency signal.

9. The LiDAR according to claim 1, further comprising:

an emitting waveguide, wherein the emitting waveguide has a light emitting surface, the emitting waveguide is configured to transmit a detection light, and the detection light is emitted via the light emitting surface;

two receiving waveguide arrays, wherein each receiving waveguide in the receiving waveguide array is arranged along a preset direction, the preset direction is parallel to the light-receiving surface, and the two receiving waveguide arrays are disposed on two sides of the emitting waveguide; and a galvanometer, wherein the galvanometer is configured to receive a detection light emitted via the emitting waveguide, and deflect the detection light so that the detection light is emitted outside the LiDAR to detect a target object, and the galvanometer is further configured to receive an echo light formed by the detection light reflected by the target object, and deflect the echo light so that the echo light is received by the receiving waveguide array, and the galvanometer has a first axis and a second axis, the galvanometer can rotate around the first axis, and the galvanometer can rotate around the second axis, and a rotation speed of the galvanometer around the first axis is faster than a rotation speed of the galvanometer around the second axis;

wherein the preset direction is that an offset direction of the echo light on the receiving waveguide arrays caused by the rotation of the galvanometer around the first axis.

10. The LiDAR according to claim 9, wherein each receiving waveguide array comprises N receiving waveguides, the two receiving waveguide arrays are a first receiving waveguide array and a second receiving waveguide array, a $n^{th}$ receiving waveguide in the first receiving waveguide array along a first direction is connected to the same analog-to-digital conversion module as a $n^{th}$ receiving waveguide in the second receiving waveguide array along a second direction, $1 \leq n \leq N$; and the first direction is a direction in which the second receiving waveguide array is directed to the first receiving waveguide array, and the second direction is a direction in which the first receiving waveguide array is directed to the second receiving waveguide array.

11. The LiDAR according to claim 10, further comprising a switch circuit;

wherein the receiving waveguide array and the galvanometer are configured to:

when the galvanometer rotates around the first axis in a first direction, a light spot of the echo light falls on the first receiving waveguide array, when the galvanometer rotates around the first axis in a second direction, a light spot of the echo light falls on the second receiving waveguide array, and the first rotating direction is opposite to the second rotating direction; and the switch circuit is configured to:

when the galvanometer rotates around the first axis in the first direction, conduct the photoelectric detection module corresponding to the first receiving waveguide array and the analog-to-digital conversion module, and when the galvanometer rotates around the first axis in the second direction, conduct the photoelectric detection module corresponding to the second receiving waveguide array and the analog-to-digital conversion module.

* * * * *